(12) United States Patent
Liu (10) Patent No.: US 11,994,931 B2
(45) Date of Patent: May 28, 2024

(54) FRAME RATE SETTING METHOD, APPARATUS, STORAGE MEDIUM AND MOBILE TERMINAL

(71) Applicant: TCL COMMUNICATION (NINGBO) CO., LTD., Zhejiang (CN)

(72) Inventor: Jie Liu, Zhejiang (CN)

(73) Assignee: TCL COMMUNICATION (NINGBO) CO., LTD., Zhejiang (CN)

( * ) Notice: Subject to any disclaimer, the term of this patent is extended or adjusted under 35 U.S.C. 154(b) by 0 days.

(21) Appl. No.: 18/250,199

(22) PCT Filed: Dec. 8, 2020

(86) PCT No.: PCT/CN2020/134471
§ 371 (c)(1),
(2) Date: Apr. 21, 2023

(87) PCT Pub. No.: WO2022/082951
PCT Pub. Date: Apr. 28, 2022

(65) Prior Publication Data
US 2023/0393643 A1    Dec. 7, 2023

(30) Foreign Application Priority Data
Oct. 23, 2020    (CN) .......................... 202011149054.6

(51) Int. Cl.
G06F 1/3234    (2019.01)
G06F 1/3296    (2019.01)

(52) U.S. Cl.
CPC .......... G06F 1/3265 (2013.01); G06F 1/3296 (2013.01)

(58) Field of Classification Search
CPC ..................................................... G06F 1/3265
See application file for complete search history.

(56) References Cited

U.S. PATENT DOCUMENTS

| | | |
|---|---|---|
| 5,991,883 A | 11/1999 | Atkinson |
| 2009/0327777 A1 | 12/2009 | Vasquez et al. |
| 2015/0379665 A1 | 12/2015 | Kwa et al. |
| 2018/0332252 A1 | 11/2018 | Wang et al. |

FOREIGN PATENT DOCUMENTS

| | | |
|---|---|---|
| CN | 103473051 A | 12/2013 |
| CN | 105869560 A | 8/2016 |
| CN | 106250085 A | 12/2016 |
| CN | 106776259 A | 5/2017 |

(Continued)

OTHER PUBLICATIONS

CN 106817755 A Jun. 9, 2017 machine translation (Year: 2023).*

(Continued)

*Primary Examiner* — Gustavo Polo
(74) *Attorney, Agent, or Firm* — PV IP PC; Zhigang Ma; Wei Te Chung (57) ABSTRACT

Provided are a frame rate setting method, apparatus, storage medium, and mobile terminal; The frame rate setting method is applied to a mobile device, and comprises: when a wake-up instruction carrying a frame rate refresh signal is received and said frame rate refresh signal is not a preset low-power signal, then setting a display frame rate of a mobile device according to a list of applications for which the frame rate is to be refreshed.

17 Claims, 4 Drawing Sheets

(56) References Cited

FOREIGN PATENT DOCUMENTS

| | | |
|---|---|---|
| CN | 106817755 A | 6/2017 |
| CN | 106933526 A | 7/2017 |
| CN | 110875978 A | 3/2020 |
| CN | 110928396 A | 3/2020 |
| CN | 111399625 A | 7/2020 |
| CN | 111610848 A | 9/2020 |
| WO | 2015178561 A1 | 11/2015 |

OTHER PUBLICATIONS

CN 106933526 A Jul. 7, 2017 machine translation (Year: 2023).*
Written Opinion of the International Search Authority in international application No. PCT/CN2020/134471, mailed on Jul. 21, 2021.
International Search Report in International application No. PCT/CN2020/134471, mailed on Jul. 21, 2021.
Chinese Office Action issued in corresponding Chinese Patent Application No. 202011149054.6 dated Apr. 22, 2022, pp. 1-8.
Notification to Grant Patent Right for Invention issued in corresponding Chinese Patent Application No. 202011149054.6 dated Aug. 22, 2022, pp. 1-4.

* cited by examiner

FRAME RATE SETTING METHOD, APPARATUS, STORAGE MEDIUM AND MOBILE TERMINAL

CROSS REFERENCE TO RELATED APPLICATIONS

This application is a US national phase application based upon an International Application No. PCT/CN2020/134471, filed on Dec. 8, 2020, which claims priority of Chinese Patent Application No. 202011149054.6, entitled "FRAME RATE SETTING METHOD, APPARATUS, STORAGE MEDIUM AND MOBILE TERMINAL" filed on Oct. 23, 2020, the disclosure of which is incorporated herein by reference in its entirety.

FIELD OF THE DISCLOSURE

The present disclosure relates to a communication technology, specifically relates to a frame rate setting method, a device, a storage medium and a mobile terminal.

BACKGROUND

In the image field, Frames Per Second (FPS) is defined as the number of frames transmitted per second. Generally speaking, it refers to the number of frames of an animation or a video. FPS measures the amount of information used to store and display a dynamic video. More frames per second means that the displayed motion will be smoother.

Currently, there are more and more terminals that support high frame rates. The commonly used frame rates are 30 Hz, 60 Hz, 90 Hz or 120 Hz, etc. Furthermore, the frame rates supported by individual applications are becoming more and more different. For example, some gaming applications can only experience extreme smoothness when the frame rate reaches 120 Hz but it is sufficient for some simple video applications to have a 60 Hz frame rate. However, conventional terminals often only support a fixed frame rate and cannot meet the needs of various applications. In addition, from the perspective of power consumption, when the display maintains a high frame rate for a long time, it increases the power consumption of the terminal.

SUMMARY

Technical Problem

One objective of an embodiment of the present disclosure is to provide a frame rate setting method, a device, a storage medium and a mobile terminal, for alleviate the power consumption technical problems caused by the fixed frame rate.

Technical Solution

According to an embodiment of the present disclosure, a frame rate setting method, used in a mobile terminal, is disclosed. The frame rate setting method comprises:
when a wake-up instruction is received, detecting whether the wake-up instruction carries a frame rate refresh signal;
when the wake-up instruction does not carry the frame rate refresh signal, setting a display frame rate of the mobile terminal as a first preset frame rate;
when the wake-up instruction carries the frame rate refresh signal, detecting whether the frame rate refresh signal is a preset low-power signal;
when the frame rate refresh signal is the preset low-power signal, setting the display frame rate of the mobile terminal as a second preset frame rate;
when the frame rate refresh signal is not the preset low-power signal, obtaining a frame rate application list to be refreshed and setting the display frame rate of the mobile terminal according to the frame rate application list to be refreshed.

According to another embodiment of the present disclosure, a frame rate setting device for a mobile terminal includes a first detection module, a first setting module, a second detection module, a second setting module, and a third setting module.

The first detection module is configured to detect whether a wake-up instruction carries a frame rate refresh signal when the wake-up instruction is received.

The first setting module is configured to set a display frame rate of the mobile terminal as a first preset frame rate when the wake-up instruction does not carry the frame rate refresh signal.

The second detection module is configured to detect whether the frame rate refresh signal is a preset low-power signal when the wake-up instruction carries the frame rate refresh signal.

The second setting module is configured to set the display frame rate of the mobile terminal as a second preset frame rate when the frame rate refresh signal is the preset low-power signal.

The third setting module is configured to obtain a frame rate application list to be refreshed and setting the display frame rate of the mobile terminal according to the frame rate application list to be refreshed when the frame rate refresh signal is not the preset low-power signal.

In the frame rate setting device, the third setting module comprises an obtaining sub-module and a first setting sub-module.

The obtaining sub-module is configured to obtain a current display frame rate of the mobile terminal.

The first setting sub-module is configured to set the display frame rate of the mobile terminal according to the current display frame rate and the frame rate application list to be refreshed.

In the frame rate setting device, the frame rate application list to be refreshed stores at least one first application identifier (ID) and a cumulative refresh number corresponding to each of the first application ID, and the first setting sub-module comprises a first judgment unit, a first setting unit, a first setting unit, and a second setting unit.

The first judgment unit is configured to determine whether the current display frame rate is a third preset frame rate.

The first setting unit is configured to set the display frame rate of the mobile terminal according to a preset list and the frame rate application list to be refreshed when the current display frame rate is the third preset frame rate.

The second judgment unit is configured to update all the cumulative refresh number and determining whether the updated cumulative refresh number has a cumulative refresh number greater than a preset number when the current display frame rate is not the third refresh frame rate.

The second setting unit is configured to set the display frame rate of the mobile terminal according to the preset list and a first application ID corresponding to the cumulative number greater than the preset number when the updated cumulative refresh number has a cumulative refresh number greater than the preset number.

In the frame rate setting device, the preset list stores a plurality of second application IDs and a plurality of preset frame rates and priorities corresponding to the second application IDs. The second setting unit is further configured to:
  obtain a second application ID, a preset frame rate and a priority matching the first application ID corresponding to the cumulative number greater than the preset number in the preset list; and
  set the preset frame rate corresponding to a second application ID having a highest priority as the display frame rate.

In the frame rate setting device, before the step of obtaining the second application ID, the preset frame rate and the priority matching with the first application ID corresponding to the cumulative number greater than the preset number in the preset list, the second setting unit is further configured to:
  determine whether the preset list has the second application ID matching the first application ID corresponding to the cumulative refresh number greater than the preset number;
  when the preset list has the second application ID matching the first application ID corresponding to the cumulative refresh number greater than the preset number, perform the step of obtaining the second application ID, the preset frame rate and the priority matching the first application ID corresponding to the cumulative number greater than the preset number in the preset list; and
  when the preset list has no second application ID matching the first application ID corresponding to the cumulative refresh number greater than the preset number, set the display frame rate as a preset default frame rate.

In the frame rate setting device, the frame rate setting device further comprises an instruction generating module.

The instruction generating module is configured to, before receiving the wake-up instruction, generate the wake-up instruction carrying the frame rate refresh signal when the mobile terminal receives the frame rate refresh signal; or
  generate the wake-up instruction when the mobile terminal turns on a frame rate adjustment function and does not receive the frame rate refresh signal for a first preset duration.

In the frame rate setting device, after setting the display frame rate of the mobile terminal as the second preset frame rate, the second setting module is further configured to:
  when a display screen of the mobile terminal remains still for a second preset duration, set the display frame rate of the mobile terminal as a fourth preset frame rate.

According to another embodiment of the present disclosure, a computer readable medium stores a plurality of instructions capable of being executed by a processor to perform the frame rate setting method.

According to another embodiment of the present disclosure, a mobile terminal includes a memory configured to store instructions and data, and a processor, electrically connected to the memory, configured to execute the instructions to perform the frame rate setting method.

Advantageous Effect

The present disclosure discloses a frame rate setting method, a device, a storage medium and a mobile terminal. The frame rate setting method is used in a mobile terminal. By receiving a wake-up instruction carrying a frame rate refresh signal and the frame rate refresh signal is not a preset low-power signal, the display frame rate of the mobile terminal is set according to the frame rate application list to be refreshed, to achieve setting the display frame rates matching different applications based on the attributes of these applications. This could not only meet the display needs of various applications, but also avoid the increase in power consumption caused by a fixed high frame rate, so as to improve the performance of the mobile terminal.

DETAILED DESCRIPTION

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

It is understood that the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

Embodiments of the present disclosure are directed to a frame rate setting method, a device, a storage medium and a mobile terminal.

Figure 1:
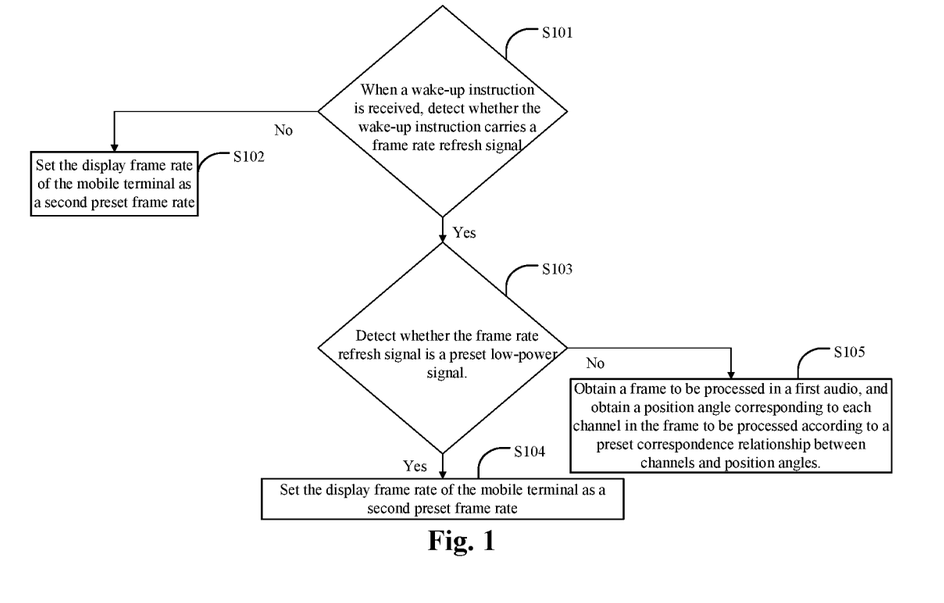
FIG. 1 is a flow chart of a frame rate setting method according to an embodiment of the present disclosure.

Please refer to FIG. 1. FIG. 1 is a flow chart of a frame rate setting method according to an embodiment of the present disclosure. The frame rate setting method is used in a mobile terminal. The mobile terminal could be any intelligent electronic device with mobile communication function, such as a smart phone, a tablet, a smart watch, etc. The frame rate setting method of the present embodiment comprises steps S101 to S105.

Step S101: when a wake-up instruction is received, detecting whether the wake-up instruction carries a frame rate refresh signal.

Figure 2:
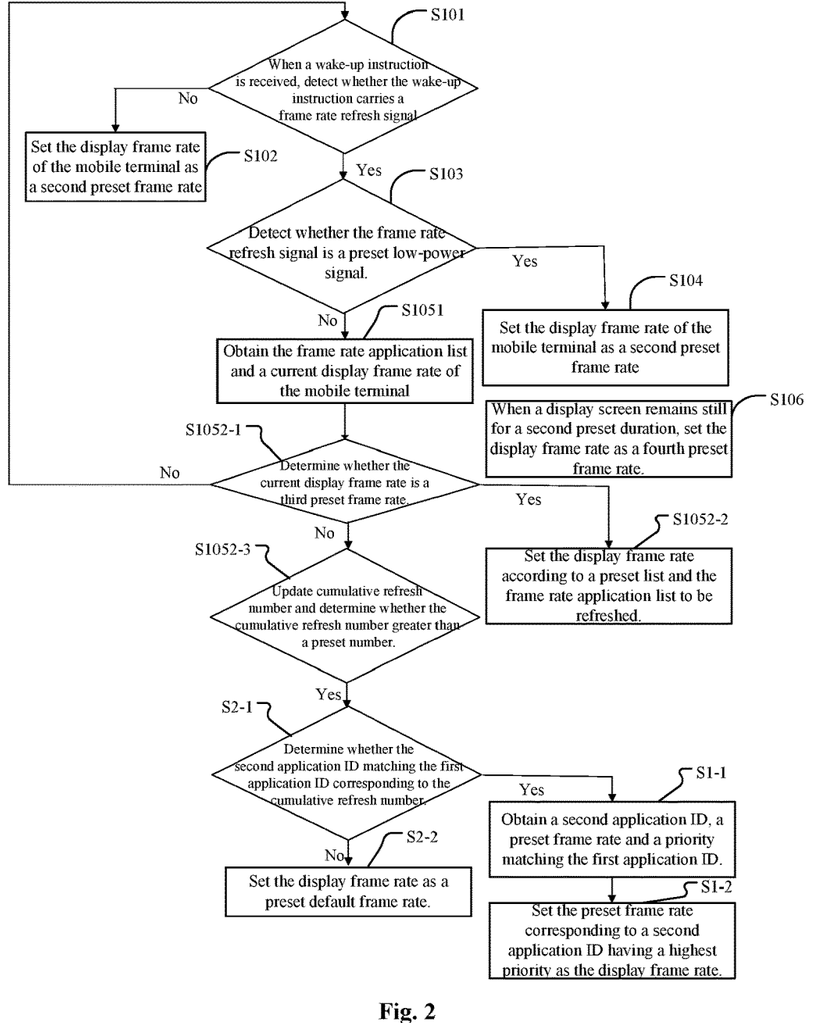
FIG. 2 is a flow chart of a frame rate setting method according to another embodiment of the present disclosure.

Please refer to FIG. 2. FIG. 2 is a flow chart of a frame rate setting method according to another embodiment of the present disclosure. Before the Step S101, the frame rate setting method may also include: when the mobile terminal receives the frame rate refresh signal, generating the wake-up instruction carrying the frame rate refresh signal; or when the mobile terminal turns on a frame rate adjustment function and does not receive the frame rate refresh signal for a first preset duration, generating the wake-up instruction.

Specifically, the frame rate refresh signal can be a Vsync signal, which is generated every time when the display frame rate of the terminal screen needs to be refreshed.

In this embodiment, when the frame rate refresh signal is not received for a first preset duration, it can be considered that the display screen of the terminal screen is still. At this time, in order to save the power consumption of the mobile terminal, the wake-up instruction may be generated to indicate that the frame rate will be reduced. Here, the first preset duration can be 5 seconds.

Step S102: setting a display frame rate of the mobile terminal as a first preset frame rate.

Specifically, the first preset frame rate can be 30 Hz. It is easy to understand that when the wake-up instruction does not carry a frame rate refresh signal, the wake-up instruction is generated under the condition that the frame rate refresh signal is not received for the first preset time. At this time, it can be considered that the display screen of the current mobile terminal is still and does not need to be updated, so that the frame rate of the terminal screen can be reduced to the lowest value to reduce the power consumption of the mobile terminal.

For example, when the user uses the mobile terminal to view a still image, when the current display frame rate of the mobile terminal is 60 Hz and the user will view the still image for more than 5 seconds, because the still image picture does not need to constantly update the image (that is, there is no need to have a high display frame rate because it will cause a waste of power consumption of the mobile terminal), a wake-up command is generated to set the display frame rate of the mobile terminal as 30 Hz.

Step S103: detecting whether the frame rate refresh signal is a preset low-power signal. When yes, then go to Step 104. When not, then go to Step S105.

In this embodiment, when the mobile terminal is in a low-power-consumption mode or a low-power mode, a preset low-power signal may be automatically generated. Or, the frame rate setting function may include a low-power-consumption state. When the user selects the low-power-consumption state, a preset low-power signal is generated. The preset low-power signal is a frame rate refresh signal that indicates that the frame rate is refreshed to a lower frame rate.

Step S104: when the frame rate refresh signal is the preset low-power signal, setting the display frame rate of the mobile terminal as a second preset frame rate.

Specifically, when the frame rate refresh signal is the preset low-power signal, in order to reduce the power consumption of the mobile terminal, regardless of which application is currently running, the display frame rate should be appropriately reduced. In this embodiment, the second preset frame rate may be 60 Hz.

Please refer to FIG. 2 again. After Step S104, Step 106 could be further included.

Step S106: when a display screen of the mobile terminal remains still for a second preset duration, setting the display frame rate of the mobile terminal as a fourth preset frame rate.

In this embodiment, the fourth preset frame rate is less than the second preset frame rate. Specifically, when a preset low-power-consumption signal is received, it can be understood that the mobile terminal currently needs to reduce power consumption, so when it is detected that the display screen of the mobile terminal remains still for the second preset duration (that is, when the display screen of the current mobile terminal is not updated), the frame rate will be further reduced to further reduce the power consumption of the mobile terminal. The fourth preset frame rate can be 30 Hz.

Step S105: obtaining a frame rate application list to be refreshed and setting the display frame rate of the mobile terminal according to the frame rate application list to be refreshed.

Please refer to FIG. 2. Step S105 may primarily include Steps S1051-S1054.

Step S1051: obtaining the frame rate application list to be refreshed and a current display frame rate of the mobile terminal.

Specifically, when the frame rate refresh signal is not the preset low-power-consumption signal, it can be considered that the mobile terminal does not need to reduce power consumption, so the display frame rate of the mobile terminal should be set to a better frame rate.

Step S1052: setting the display frame rate of the mobile terminal according to the current display frame rate and the frame rate application list to be refreshed.

In this embodiment, the frame rate application list to be refreshed stores at least one first application identification (ID) and a cumulative refresh number corresponding to each of the first application ID. Step S1052 mainly includes steps S1052-1 to Step S1052-4:

Step S1052-1: determining whether the current display frame rate is a third preset frame rate. When yes, go to Step S1052-2. Otherwise, go to Step S1052-3.

Specifically, the third preset frame rate is the lowest frame rate. That is, Step 1052-1 is to determine whether the current display frame rate is the lowest value. When the current display frame rate is the lowest value, in order to ensure the smoothness from a still picture to the movement without any lag, the frame rate refresh signal needs to respond immediately.

For example, when the current display frame rate is 30 Hz, the user may open a game application and the display frame rate of the game application is generally greater than 100 Hz. At this time, when the display frame rate is not immediately set to more than 100 Hz, it may cause the screen of the game application to freeze. This will greatly degrade the user experience.

Step S1052-2: setting the display frame rate of the mobile terminal according to a preset list and the frame rate application list to be refreshed.

In this embodiment, the preset list stores a plurality of preset applications, optimal frame rates and priorities corresponding to the preset applications. Step S1052-2 may comprise: obtaining the preset application, the optimal frame rate and the priority corresponding to the first application ID in the frame rate application list to be refreshed from the preset list; and setting the optimal frame rate for the preset application corresponding to the first application ID having the highest priority as the display frame rate.

Step S1052-3: updating all the cumulative refresh number and determining whether the updated cumulative refresh number has a cumulative refresh number greater than a preset number. When yes, then go to Step S1052-4. Otherwise, go to Step S1052-5.

Specifically, when the current display frame rate is not the lowest frame rate, in order to avoid the current frame rate refresh signal as a glitch signal for some applications, the cumulative refresh number is updated first. That is, the cumulative refresh number is increased by one. And then, the method determines whether the increased cumulative refresh number is greater than the preset number. Only when the cumulative refresh number is greater than the preset number, a response is made. Here, the preset number can be 60 (times). That is, the response is only made when the frame rate refresh signal sent by the application is received for 60 times.

S1052-4: setting the display frame rate of the mobile terminal according to the preset list and a first application ID corresponding to the cumulative number greater than the preset number.

In some embodiments, the preset list stores a plurality of second application IDs and a plurality of preset frame rates and priorities corresponding to the second application IDs. Step S1052-4 mainly includes Step S1-1 and Step S1-2:

Step S1-1: obtaining a second application ID, a preset frame rate and a priority matching the first application ID corresponding to the cumulative number greater than the preset number from the preset list.

Specifically, the second application ID can be the application name. The preset frame rate can be the optimal display frame rate for each application. The priority can be set according to the frame rate or power consumption based on actual demands.

Step S1-2: setting the preset frame rate corresponding to a second application ID having a highest priority as the display frame rate.

When there are multiple applications that need to refresh the frame rate, the frame rate for the application having the highest priority is selected to be the display frame rate.

Before Step S1-1, the method may further comprise:

Step S2-1: determining whether the preset list has the second application ID matching the first application ID corresponding to the cumulative refresh number greater than the preset number. When yes, go to Step S1-1. Otherwise, go to Step S2-2.

Step S2-2: setting the display frame rate as a preset default frame rate.

Specifically, the preset default frame rate may be the highest frame rate supported by the terminal screen. In this embodiment, the preset default frame rate may be 120 Hz. It is easy to understand that when there is no second application ID in the preset list that matches the first application ID corresponding to the cumulative refresh number greater than the preset number, in order to avoid stuttering caused by the low frame rate of the display screen, the display frame rate can be set to the highest frame rate supported by the terminal screen.

The specific frame rate disclosed in the present disclosure should not be regarded as a limitation of the present disclosure. The actual frame rate size can be set according to the actual requirements.

Figure 3:
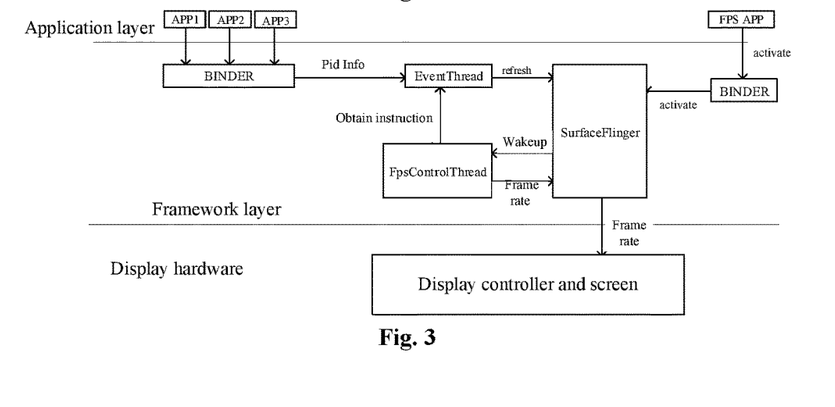
FIG. 3 is a diagram of a frame rate setting process according to an embodiment of the present disclosure.

For easily understanding, in the following disclosure, an Android system will be used as an example to illustrate the frame rate setting process. Please refer to FIG. 3. FIG. 3 is a diagram of a frame rate setting process according to an embodiment of the present disclosure.

First, a new control thread, named FpsControlThread, is started in the SurfaceFlinger, which is used for display control, in the Android system. Here FpsControlThread is responsible for frame rate settings. A whitelist, which is the aforementioned preset list, is embedded in FpsControlThread as a reference for frame rate settings.

In the application layer, when the user starts the frame rate setting function through the frame rate setting application, FPS APP, the frame rate setting application sends a start command to the Surface Flinger through the interface of the BINDER thread, and thus Surface Flinger starts FpsControlThread thread. It could be understood that although not shown in the figure, when the user wants to turn off the frame rate setting function, the frame rate setting function can also be turned off through the FPS APP. In this case, FPS APP sends a turn-off instruction to Surface Flinger through the interface of BINDER thread and Surface Flinger turns off FpsControlThread thread. When APP 1, APP 2, and/or APP3 need to refresh the frame rate, through RequestNext VsyncWithPid interface of the BINDER thread, the request of a frame rate refresh could be sent to SurfaceFlinger, and the application's own port thread ID, i.e., pid information, is sent to the EventThread thread. The EventThread thread compiles all the pid information of the requests of the frame rate refresh into a list (the aforementioned frame rate refresh application list to be refreshed) and saves the list for the FpsControlThread thread to obtain. When the Surface Flinger receives a frame rate refresh request (refresh), it sends a wake-up command to the FpsControlThread thread. Then, the FpsControlThread thread sends a fetch instruction to the EventThread thread to get list of applications to be refreshed. And then, the FpsControlThread thread determines the display frame rate based on the list of applications to be refreshed, and passes the frame rate setting to the display hardware, i.e. the display controller and display, through the SurfaceFlinger and then goes into a sleep mode.

The present disclosure discloses a frame rate setting method, a device, a storage medium and a mobile terminal. The frame rate setting method is used in a mobile terminal. By receiving a wake-up instruction carrying a frame rate refresh signal and the frame rate refresh signal is not a preset low-power signal, the display frame rate of the mobile terminal is set according to the frame rate application list to be refreshed, to achieve setting the display frame rates matching different applications based on the attributes of these applications. This could not only meet the display needs of various applications, but also avoid the increase in power consumption caused by a fixed high frame rate, so as to improve the performance of the mobile terminal.

According to the method described in the above embodiments, in the following disclosure, a frame rate setting device will be illustrated. The frame rate setting device may be implemented as an independent device or integrated in the mobile terminal.

Figure 4:
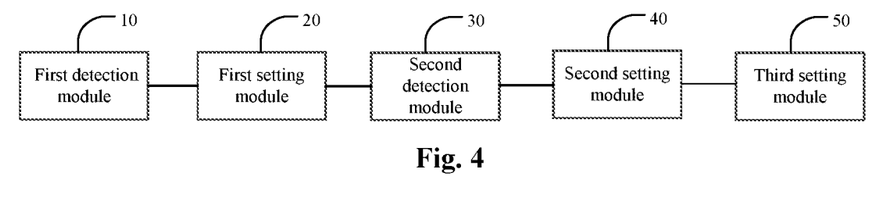
FIG. 4 is a diagram of a frame rate setting device according to an embodiment of the present disclosure.

Please refer to FIG. 4. FIG. 4 is a diagram of a frame rate setting device according to an embodiment of the present disclosure. The frame rate setting device is used in a mobile terminal. The frame rate setting device comprises a first detection module 10, a first setting module 20, a second detection module 30, a second setting module 40 and a third setting module 50.

(1) First Detection Module 10

The first detection module 10 is configured to detect whether a wake-up instruction carries a frame rate refresh signal when the wake-up instruction is received.

(2) First Setting Module 20

The first setting module 20 is configured to set a display frame rate of the mobile terminal as a first preset frame rate when the wake-up instruction does not carry the frame rate refresh signal.

(3) Second Detection Module 30

The second detection module 30 is configured to detect whether the frame rate refresh signal is a preset low-power signal when the wake-up instruction carries the frame rate refresh signal.

(4) Second Setting Module 40

The second setting module 40 is configured to set the display frame rate of the mobile terminal as a second preset frame rate when the frame rate refresh signal is the preset low-power signal.

Furthermore, after setting the display frame rate of the mobile terminal as the second preset frame rate, the second setting module 40 is also configured to:

set the display frame rate of the mobile terminal as a fourth preset frame rate when a display screen of the mobile terminal remains still for a second preset duration after setting the display frame rate of the mobile terminal as the second preset frame rate. The fourth preset frame rate is less than the second preset frame rate.

(5) Third Setting Module 50

The third setting module 50 is configured to obtain a frame rate application list to be refreshed and setting the display frame rate of the mobile terminal according to the frame rate application list to be refreshed when the frame rate refresh signal is not the preset low-power signal.

Figure 5:
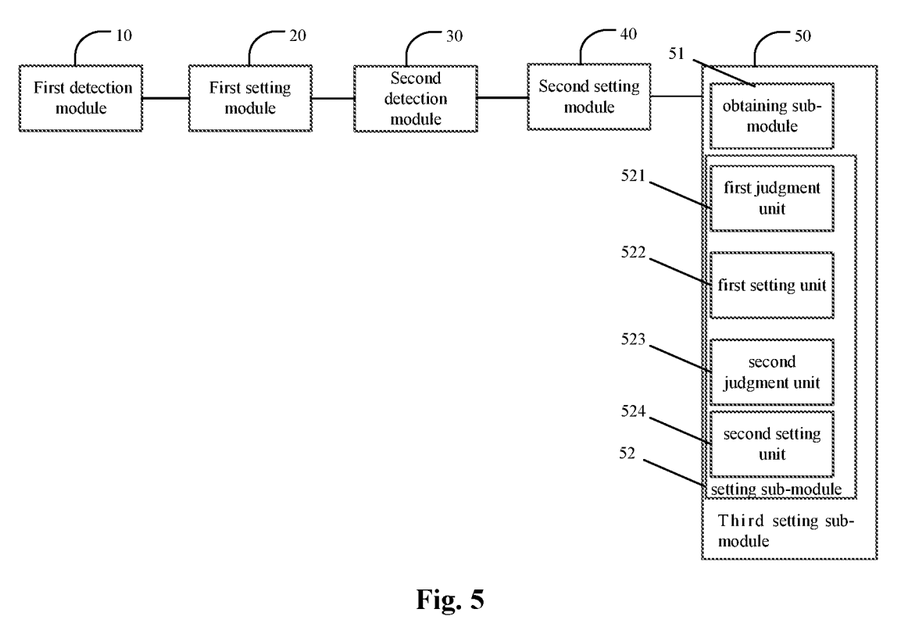
FIG. 5 is a diagram of a frame rate setting device according to another embodiment of the present disclosure.

Please refer to FIG. 5. FIG. 5 is a diagram of a frame rate setting device according to another embodiment of the present disclosure. The third setting module 50 comprises an obtaining sub-module 51 and a first setting sub-module 52.

The obtaining sub-module 51 is configured to obtain a current display frame rate of the mobile terminal.

The first setting sub-module 52 is configured to set the display frame rate of the mobile terminal according to the current display frame rate and the frame rate application list to be refreshed.

Please refer to FIG. 5. The frame rate application list to be refreshed stores at least one first application identifier (ID) and a cumulative refresh number corresponding to each of the first application ID, and the first setting sub-module comprises a first judgment unit 521, a first setting unit 522, a second judgment unit 523 and a second setting unit 524.

The first judgment unit 521 is configured to determine whether the current display frame rate is a third preset frame rate.

The first setting unit 522 is configured to set the display frame rate of the mobile terminal according to a preset list and the frame rate application list to be refreshed when the current display frame rate is the third preset frame rate.

The second judgment unit 523 is configured to update all the cumulative refresh number and determining whether the updated cumulative refresh number has a cumulative refresh number greater than a preset number when the current display frame rate is not the third refresh frame rate.

The second setting unit 524 is configured to set the display frame rate of the mobile terminal according to the preset list and a first application ID corresponding to the cumulative number greater than the preset number when the updated cumulative refresh number has a cumulative refresh number greater than the preset number.

In this embodiment, the preset list stores a plurality of second application IDs and a plurality of preset frame rates and priorities corresponding to the second application IDs.

The second setting unit 524 is further configured to obtain a second application ID, a preset frame rate and a priority matching the first application ID corresponding to the cumulative number greater than the preset number in the preset list.

The second setting unit 524 is further configured to set the preset frame rate corresponding to a second application ID having a highest priority as the display frame rate.

In this embodiment, the second setting unit 524 is further configured to:

determine whether the preset list has the second application ID matching the first application ID corresponding to the cumulative refresh number greater than the preset number before obtaining the second application ID, the preset frame rate and the priority matching with the first application ID corresponding to the cumulative number greater than the preset number in the preset list;

determine whether the preset list has the second application ID matching the first application ID corresponding to the cumulative refresh number greater than the preset number;

when the preset list has the second application ID matching the first application ID corresponding to the cumulative refresh number greater than the preset number, perform the step of obtaining the second application ID, the preset frame rate and the priority matching the first application ID corresponding to the cumulative number greater than the preset number in the preset list; and when the preset list has no second application ID matching the first application ID corresponding to the cumulative refresh number greater than the preset number, set the display frame rate as a preset default frame rate.

In addition, the frame rate setting device could further comprise an instruction generating module 60.

The instruction generating module 60 is configured to, before receiving the wake-up instruction, generate the wake-up instruction carrying the frame rate refresh signal when the mobile terminal receives the frame rate refresh signal; or generate the wake-up instruction when the mobile terminal turns on a frame rate adjustment function and does not receive the frame rate refresh signal for a first preset duration.

In the actual implementation, the aforementioned modules can be implemented as independent devices, or in any combination thereof as one or more devices. The function and implementation of the above modules can refer to the aforementioned frame rate setting method, and further illustrations are omitted here for simplicity.

To sum up, the frame rate setting device includes the first detection module 10, the first setting module 20, the second detection module 30, the second setting module 40 and the third setting module 50. The first detection module 10 is configured to detect whether a wake-up instruction carries a frame rate refresh signal when the wake-up instruction is received. The first setting module 20 is configured to set a display frame rate of the mobile terminal as a first preset frame rate when the wake-up instruction does not carry the frame rate refresh signal. The second detection module 30 is configured to detect whether the frame rate refresh signal is a preset low-power signal when the wake-up instruction carries the frame rate refresh signal. The second setting module 40 is configured to set the display frame rate of the mobile terminal as a second preset frame rate when the frame rate refresh signal is the preset low-power signal. The third setting module 50 is configured to obtain a frame rate application list to be refreshed and setting the display frame rate of the mobile terminal according to the frame rate application list to be refreshed when the frame rate refresh signal is not the preset low-power signal. By receiving a wake-up instruction carrying a frame rate refresh signal and the frame rate refresh signal is not a preset low-power signal, the display frame rate of the mobile terminal is set according to the frame rate application list to be refreshed, to achieve setting the display frame rates matching different applications based on the attributes of these applications. This could not only meet the display needs of various applications, but also avoid the increase in power consumption caused by a fixed high frame rate, so as to improve the performance of the mobile terminal.

Figure 6:
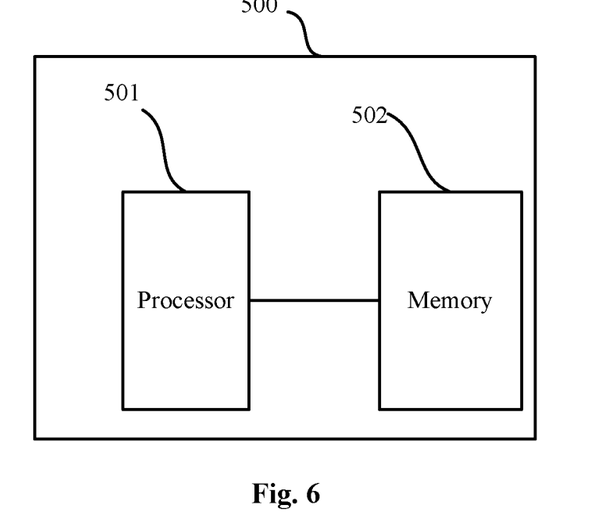
FIG. 6 is a diagram of a mobile terminal according to an embodiment of the present disclosure.

According to an embodiment of the present disclosure, a mobile terminal is disclosed. The mobile terminal may be a smart phone, a tablet or any other devices. As shown in FIG. 6, the mobile terminal 500 comprises a processor 501 and a memory 502. The processor 501 is electrically connected to the memory 502.

The processor 501 is the control center of the mobile terminal 500. The processor 501 uses various interfaces and lines to connect various parts in the mobile terminal 500. The processor 501 runs or loads applications stored in the memory 502 and accesses the data stored in the memory 502 to perform various functions and process data of the mobile terminal 500 to control the mobile terminal 500.

In this embodiment, the processor 501 in the mobile terminal 500 could load the instructions corresponding to one or more application programs into the memory 502 executes the application program(s) stored in the memory 502 to perform the operations or steps disclosed in any of the frame rate setting methods in the above-mentioned embodiments of the present disclosure. The operations includes:
  when a wake-up instruction is received, detecting whether the wake-up instruction carries a frame rate refresh signal;
  when the wake-up instruction does not carry the frame rate refresh signal, setting a display frame rate of the mobile terminal as a first preset frame rate;
  when the wake-up instruction carries the frame rate refresh signal, detecting whether the frame rate refresh signal is a preset low-power signal;
  when the frame rate refresh signal is the preset low-power signal, setting the display frame rate of the mobile terminal as a second preset frame rate; and
  when the frame rate refresh signal is not the preset low-power signal, obtaining a frame rate application list to be refreshed and setting the display frame rate of the mobile terminal according to the frame rate application list to be refreshed.

Figure 7:
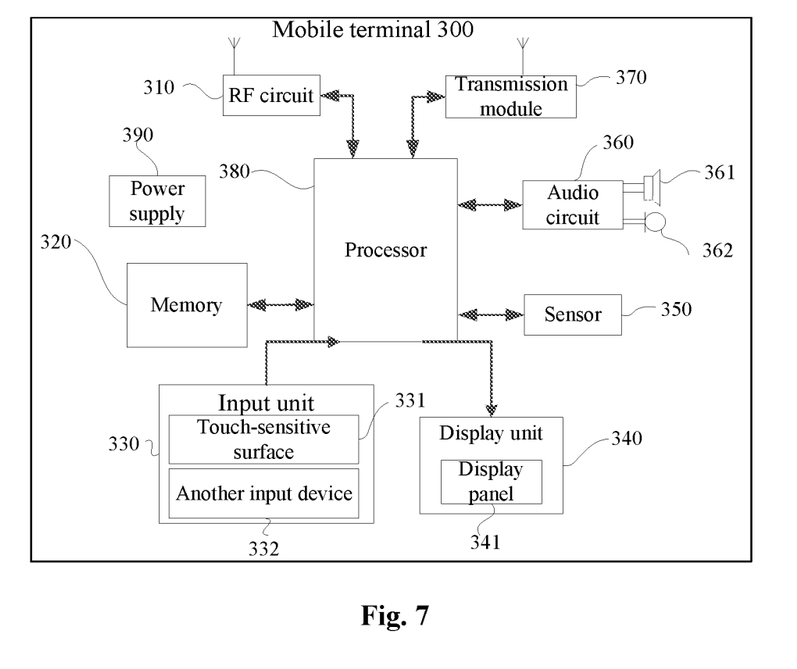
FIG. 7 is a diagram of a mobile terminal according to another embodiment of the present disclosure.

Please refer to FIG. 7. FIG. 7 is a diagram of a mobile terminal according to another embodiment of the present disclosure. The mobile terminal could be used to implement the frame rate setting method disclosed in any of the above embodiments. The mobile terminal 300 can be a smart phone or a tablet.

The RF circuit 310 may be configured to receive and send a signal during an information receiving and sending process or a conversation process. Specifically, after receiving downlink information from a base station, the RF circuit 310 delivers the downlink information to one or more processors 380 for processing, and sends related uplink data to the base station. Generally, the RF circuit 310 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 310 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE 802.11g and IEEE 802.11n, a Voice over Internet Protocol (VoIP), a Worldwide Interoperability for Microwave Access (Wi-Max), any other protocols for e-mail, instant communication and short message, and the like.

The memory 320 may be configured to store a software program and module. The processor 380 runs the software program and module stored in the memory 320, to implement various functional applications and data processing. The memory 320 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 320 may include a high speed random access memory, and may also include a non-volatile memory, such as at least one magnetic disk memory, a flash memory device, or another volatile solid-state memory. Correspondingly, the memory 320 may further include a memory controller, so that the processor 380 and the input unit 330 access the memory 320.

The input unit 330 may be configured to receive input digit or character information, and generate keyboard, mouse, joystick, optical, or track ball signal input related to the user setting and function control. Specifically, the input unit 330 may include a touch-sensitive surface 331 and other input device 332. The touch-sensitive surface 331 may also be referred to as a touch screen or a touch panel, and may collect a touch operation of a user on or near the touch-sensitive surface 331 (such as an operation of a user on or near the touch-sensitive surface by using any suitable object or attachment, such as a finger or a stylus), and drive a corresponding connection apparatus according to a preset program. Optionally, the touch-sensitive surface 331 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 380. Moreover, the touch controller can receive and execute a command sent from the processor 380. In addition, the touch-sensitive surface may be implemented by using various types, such as a resistive type, a capacitance type, an infrared type, and a surface sound wave type. In addition to the touch-sensitive surface 331, the input unit 330 may further include the another input device. Specifically, the another input device 332 may include, but is not limited to, one or more of a physical keyboard, a functional key (such as a volume control key or a switch key), a track ball, a mouse, and a joystick.

The display unit 340 may be configured to display information input by the user or information provided for the user, and various graphical user ports of the mobile terminal. The graphical user ports may be formed by a graph, a text, an icon, a video, and any combination thereof. The display unit 340 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 380, so as to determine a type of a touch event. Then, the processor 380 provides corresponding visual output on the display panel according to the type of the touch event. Although, in FIG. 8, the touch-sensitive surface and the display panel are used as two separate parts to implement input and output functions, in some embodiments, the touch-sensitive surface and the display panel may be integrated to implement the input and output functions.

The mobile terminal may further include at least one sensor 350, such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the mobile terminal are not further described herein.

The audio circuit 360, a speaker 361, and a microphone 362 may provide audio interfaces between the user and the mobile terminal. The audio circuit 360 may transmit, to the speaker 361, a received electric signal converted from received audio data. The speaker 361 converts the electric signal into a sound signal for output. On the other hand, the microphone 362 converts a collected sound signal into an electric signal. The audio circuit 360 receives the electric signal and converts the electric signal into audio data, and outputs the audio data to the processor 380 for processing. Then, the processor 380 sends the audio data to, for example, another terminal by using the RF circuit 310, or outputs the audio data to the memory 320 for further processing. The audio circuit 360 may further include an earplug jack, so as to provide communication between a peripheral earphone and the mobile terminal.

The mobile terminal may help, by using the transmission module 370 (e.g. Wi-Fi module), a user to receive and send an e-mail, browse a webpage, and access stream media, and the like, which provides wireless broadband Internet access for the user. Although FIG. 8 shows the transmission module 370, it may be understood that, the wireless communications unit is not a necessary component of the mobile terminal, and can be ignored according to demands without changing the scope of the essence of the present disclosure.

The processor 380 is a control center of the mobile terminal, and connects various parts of the terminal by using various interfaces and lines. By running or executing the software program and/or module stored in the memory 320, and invoking data stored in the memory 320, the processor 380 performs various functions and data processing of the mobile terminal, thereby performing overall monitoring on the mobile phone. Optionally, the processor 380 may include one or more processing cores. Preferably, the processor 380 may integrate an application processor and a modem. The application processor mainly processes an operating system, a user interface, an application program, and the like. The modem mainly processes wireless communication. It may be understood that, the foregoing modem may not be integrated into the processor 380.

The mobile terminal further includes the power supply 390 (such as a battery) for supplying power to the components. Preferably, the power supply may be logically connected to the processor 380 by using a power supply management system, thereby implementing functions, such as charging, discharging, and power consumption management, by using the power supply management system. The power supply 390 may further include any component, such as one or more direct current or alternate current power supplies, a re-charging system, a power supply fault detection circuit, a power supply converter or an inverter, and a power supply state indicator.

Although not shown, the mobile terminal 300 may further comprise a camera (such as, a front camera, a rear camera), a Bluetooth module, and the like, which will not be described in detail. The display unit 340 of the mobile terminal 300 is a touch screen display. The mobile terminal 300 also comprises the memory 320 and one or more programs, wherein the one or more programs are stored in the memory 320 and are configured to be executed by the one or more processors 380 to perform the operations of:
  when a wake-up instruction is received, detecting whether the wake-up instruction carries a frame rate refresh signal;
  when the wake-up instruction does not carry the frame rate refresh signal, setting a display frame rate of the mobile terminal as a first preset frame rate;
  when the wake-up instruction carries the frame rate refresh signal, detecting whether the frame rate refresh signal is a preset low-power signal;
  when the frame rate refresh signal is the preset low-power signal, setting the display frame rate of the mobile terminal as a second preset frame rate; and
  when the frame rate refresh signal is not the preset low-power signal, obtaining a frame rate application list to be refreshed and setting the display frame rate of the mobile terminal according to the frame rate application list to be refreshed.

In the actual implementation, the aforementioned modules can be implemented as independent devices, or in any combination thereof as one or more devices. The function and implementation of the above modules can refer to the aforementioned frame rate setting method, and further illustrations are omitted here for simplicity.

One having ordinary skills in the art may understand that all or part of the steps in the aforementioned methods in the above embodiments may be completed by instructions or by controlling relevant hardware through instructions. The instructions may be stored in a computer-readable storage medium, loaded and executed by the processor. For this, according to an embodiment of the present disclosure, a non-transitory storage medium is disclosed. The non-transitory storage medium includes a mobile terminal executable instruction. The mobile terminal executable instruction is executed by the mobile terminal processor to execute one or more steps in any frame rate setting methods of any of the aforementioned embodiments.

The non-transitory storage medium includes a read only memory (ROM), a random access memory (RAM), an optical disk or a hard disk.

Since the instructions stored in the storage medium can perform any of the steps in the frame rate setting method of any of the aforementioned embodiments, the beneficial effect of any frame rate setting method any of the aforementioned embodiments could be achieved. For more details, please refer to the previous disclosure and further illustrations are omitted here.

The actual implementation of each of the above operations may be referred to the above-mentioned embodiments. Further illustrations are omitted here.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A frame rate setting method, used in a mobile terminal, the frame rate setting method comprising:
   when the mobile terminal receives a frame rate refresh signal, generating a wake-up instruction carrying the frame rate refresh signal, or when the mobile terminal turns on a frame rate adjustment function and does not receive the frame rate refresh signal for a first preset duration, generating the wake-up instruction;
   when the wake-up instruction is received, detecting whether the wake-up instruction carries the frame rate refresh signal;
   when the wake-up instruction does not carry the frame rate refresh signal, setting a display frame rate of the mobile terminal as the first preset frame rate;
   when the wake-up instruction carries the frame rate refresh signal, detecting whether the frame rate refresh signal is a preset low-power signal;
   when the frame rate refresh signal is the preset low-power signal, setting the display frame rate of the mobile terminal as a second preset frame rate; and
   when the frame rate refresh signal is not the preset low-power signal, obtaining a frame rate application list to be refreshed and setting the display frame rate of the mobile terminal according to the frame rate application list to be refreshed.

2. The frame rate setting method of claim 1, wherein the step of setting the display frame rate of the mobile terminal according to the frame rate application list to be refreshed comprises:
   obtaining a current display frame rate of the mobile terminal; and
   setting the display frame rate of the mobile terminal according to the current display frame rate and the frame rate application list to be refreshed.

3. The frame rate setting method of claim 2, wherein the frame rate application list to be refreshed stores at least one first application identifier (ID) and a cumulative refresh number corresponding to each of the first application ID, and the step of setting the display frame rate of the mobile terminal according to the current display frame rate and the frame rate application list to be refreshed comprising:
   determining whether the current display frame rate is a third preset frame rate;
   when the current display frame rate is the third preset frame rate, setting the display frame rate of the mobile terminal according to a preset list and the frame rate application list to be refreshed;
   when the current display frame rate is not the third refresh frame rate, updating all the cumulative refresh number and determining whether the updated cumulative refresh number has a cumulative refresh number greater than a preset number; and
   when the updated cumulative refresh number has a cumulative refresh number greater than the preset number, setting the display frame rate of the mobile terminal according to the preset list and a first application ID corresponding to the cumulative number greater than the preset number.

4. The frame rate setting method of claim 3, wherein the preset list stores a plurality of second application IDs and a plurality of preset frame rates and priorities corresponding to the second application IDs, and the step of setting the display frame rate of the mobile terminal according to the preset list and the first application ID corresponding to the cumulative number greater than the preset number comprises:
   obtaining a second application ID, a preset frame rate and a priority matching the first application ID corresponding to the cumulative number greater than the preset number from the preset list; and
   setting the preset frame rate corresponding to a second application ID having a highest priority as the display frame rate.

5. The frame rate setting method of claim 4, further comprising following steps before the step of obtaining the second application ID, the preset frame rate and the priority matching with the first application ID corresponding to the cumulative number greater than the preset number in the preset list:
   determining whether the preset list has the second application ID matching the first application ID corresponding to the cumulative refresh number greater than the preset number;
   when the preset list has the second application ID matching the first application ID corresponding to the cumulative refresh number greater than the preset number, then performing the step of obtaining the second application ID, the preset frame rate and the priority matching the first application ID corresponding to the cumulative number greater than the preset number in the preset list; and
   when the preset list has no second application ID matching the first application ID corresponding to the cumulative refresh number greater than the preset number, setting the display frame rate as a preset default frame rate.

6. The frame rate setting method of claim 1, further comprising following steps after the step of setting the display frame rate of the mobile terminal as the second preset frame rate:
   when a display screen of the mobile terminal remains still for a second preset duration, setting the display frame rate of the mobile terminal as a fourth preset frame rate;
   wherein the fourth preset frame rate is less than the second preset frame rate.

7. The frame rate setting method of claim 1, further comprising:
   when the mobile terminal is in a low-power-consumption mode or a low-power mode, generating a preset low-power-consumption signal;
   wherein the preset low-power-consumption signal is one type of frame rate refresh signals.

8. The frame rate setting method of claim 1, wherein the mobile terminal comprises a frame rate setting function, and the frame rate setting method further comprises:
when a low-power-consumption state in the frame rate setting function is selected, generating a preset low-power-consumption signal;
wherein a preset low-power-consumption signal is one type of frame rate refresh signals.

9. A non-transitory computer readable medium, storing a plurality of instructions capable of being executed by a processor to perform operations comprising:
when the mobile terminal receives a frame rate refresh signal, generating a wake-up instruction carrying the frame rate refresh signal, or when the mobile terminal turns on a frame rate adjustment function and does not receive the frame rate refresh signal for a first preset duration, generating the wake-up instruction;
when the wake-up instruction is received, detecting whether the wake-up instruction carries the frame rate refresh signal;
when the wake-up instruction does not carry the frame rate refresh signal, setting a display frame rate of the mobile terminal as the first preset frame rate;
when the wake-up instruction carries the frame rate refresh signal, detecting whether the frame rate refresh signal is a preset low-power signal;
when the frame rate refresh signal is the preset low-power signal, setting the display frame rate of the mobile terminal as a second preset frame rate; and
when the frame rate refresh signal is not the preset low-power signal, obtaining a frame rate application list to be refreshed and setting the display frame rate of the mobile terminal according to the frame rate application list to be refreshed.

10. A mobile terminal, comprising:
a memory, configured to store instructions and data; and
a processor, electrically connected to the memory, configured to execute the instructions to perform operations comprising:
when the mobile terminal receives a frame rate refresh signal, generating a wake-up instruction carrying the frame rate refresh signal, or when the mobile terminal turns on a frame rate adjustment function and does not receive the frame rate refresh signal for a first preset duration, generating the wake-up instruction;
when the wake-up instruction is received, detecting whether the wake-up instruction carries the frame rate refresh signal;
when the wake-up instruction does not carry the frame rate refresh signal, setting a display frame rate of the mobile terminal as the first preset frame rate;
when the wake-up instruction carries the frame rate refresh signal, detecting whether the frame rate refresh signal is a preset low-power signal;
when the frame rate refresh signal is the preset low-power signal, setting the display frame rate of the mobile terminal as a second preset frame rate; and
when the frame rate refresh signal is not the preset low-power signal, obtaining a frame rate application list to be refreshed and setting the display frame rate of the mobile terminal according to the frame rate application list to be refreshed.

11. The mobile terminal of claim 10, wherein the operation of setting the display frame rate of the mobile terminal according to the frame rate application list to be refreshed comprises:
obtaining a current display frame rate of the mobile terminal; and
setting the display frame rate of the mobile terminal according to the current display frame rate and the frame rate application list to be refreshed.

12. The mobile terminal of claim 11, wherein the frame rate application list to be refreshed stores at least one first application identifier (ID) and a cumulative refresh number corresponding to each of the first application ID, and the step of setting the display frame rate of the mobile terminal according to the current display frame rate and the frame rate application list to be refreshed comprising:
determining whether the current display frame rate is a third preset frame rate;
when the current display frame rate is the third preset frame rate, setting the display frame rate of the mobile terminal according to a preset list and the frame rate application list to be refreshed;
when the current display frame rate is not the third refresh frame rate, updating all the cumulative refresh number and determining whether the updated cumulative refresh number has a cumulative refresh number greater than a preset number; and
when the updated cumulative refresh number has a cumulative refresh number greater than the preset number, setting the display frame rate of the mobile terminal according to the preset list and a first application ID corresponding to the cumulative number greater than the preset number.

13. The mobile terminal of claim 12, wherein the preset list stores a plurality of second application IDs and a plurality of preset frame rates and priorities corresponding to the second application IDs, and the step of setting the display frame rate of the mobile terminal according to the preset list and the first application ID corresponding to the cumulative number greater than the preset number comprises:
obtaining a second application ID, a preset frame rate and a priority matching the first application ID corresponding to the cumulative number greater than the preset number from the preset list; and
setting the preset frame rate corresponding to a second application ID having a highest priority as the display frame rate.

14. The mobile terminal of claim 13, wherein before the operation of obtaining the second application ID, the preset frame rate and the priority matching with the first application ID corresponding to the cumulative number greater than the preset number in the preset list, the operations further comprise:
determining whether the preset list has the second application ID matching the first application ID corresponding to the cumulative refresh number greater than the preset number;
when the preset list has the second application ID matching the first application ID corresponding to the cumulative refresh number greater than the preset number, then performing the step of obtaining the second application ID, the preset frame rate and the priority matching the first application ID corresponding to the cumulative number greater than the preset number in the preset list; and
when the preset list has no second application ID matching the first application ID corresponding to the cumulative refresh number greater than the preset number, setting the display frame rate as a preset default frame rate.

15. The mobile terminal of claim 10, wherein after the operation of setting the display frame rate of the mobile terminal as the second preset frame rate, the operations further comprise:
- when a display screen of the mobile terminal remains still for a second preset duration, setting the display frame rate of the mobile terminal as a fourth preset frame rate;
- wherein the fourth preset frame rate is less than the second preset frame rate.

16. The mobile terminal of claim 10, wherein the operations further comprise:
- when the mobile terminal is in a low-power-consumption mode or a low-power mode, generating a preset low-power-consumption signal;
- wherein the preset low-power-consumption signal is one type of frame rate refresh signals.

17. The mobile terminal of claim 10, wherein the mobile terminal comprises a frame rate setting function, and the frame rate setting method further comprises:
- when a low-power-consumption state in the frame rate setting function is selected, generating a preset low-power-consumption signal;
- wherein a preset low-power-consumption signal is one type of frame rate refresh signals.

* * * * *